United States Patent
Mahimkar et al.

(10) Patent No.: US 10,219,261 B2
(45) Date of Patent: Feb. 26, 2019

(54) METHOD AND APPARATUS FOR TRANSMITTING A CONTROL SIGNAL TO A SELF ORGANIZING NETWORK CONTROLLER

(71) Applicants: AT&T Intellectual Property I, L.P., Atlanta, GA (US); AT&T Mobility II LLC, Atlanta, GA (US)

(72) Inventors: Ajay Mahimkar, Woodbridge, NJ (US); Shomik Pathak, Richardson, TX (US); David Lee Applegate, Maplewood, NJ (US); Sarat Puthenpura, Berkeley Heights, NJ (US); Zihui Ge, Madison, NJ (US); Kurt Huber, Kennesaw, GA (US); Swati Roy, Princeton, NJ (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 115 days.

(21) Appl. No.: 14/962,802

(22) Filed: Dec. 8, 2015

(65) Prior Publication Data
US 2017/0164334 A1 Jun. 8, 2017

(51) Int. Cl.
H04W 24/02 (2009.01)
H04W 72/04 (2009.01)
H04W 84/18 (2009.01)

(52) U.S. Cl.
CPC .......... *H04W 72/042* (2013.01); *H04W 84/18* (2013.01)

(58) Field of Classification Search
None
See application file for complete search history.

(56) References Cited

U.S. PATENT DOCUMENTS 8,385,900 B2 2/2013 Trigui
8,498,207 B2 7/2013 Trigui et al.
(Continued)

FOREIGN PATENT DOCUMENTS

EP 2430851 3/2012
EP 2817997 12/2014
(Continued)

OTHER PUBLICATIONS

"Intelligent Self Organizing Networks (iSON)," Nokia, networks. nokia.com, Oct. 13, 2015 https://web.archive.org/web/20151013141522/ http://networks.nokia.com/be/portfolio/solutions/self-organizing-networks Discloses the Nokia Eden-NET centralized SON solution for complex multivendor networks that helps operators automate their network operators to provide substantial improvements to the performance and reliability of mobile networks.
(Continued)

*Primary Examiner* — Gregory B Sefcheck
*Assistant Examiner* — Jenkey Van (57) ABSTRACT

A method and apparatus for transmitting a control signal to a self organizing network controller, are disclosed. For example, the method implemented via a processor receives a change, determines whether the change to at least one network element maintains an acceptable level for one or more service quality metrics based on a predicted service quality metric calculated using a modeling function, generates a control signal based on the determining, and transmits the control signal to the self organizing network controller to cause the self organizing network controller to configure the at least one network element in a communication network in accordance with the control signal.

18 Claims, 5 Drawing Sheets

(56) References Cited

U.S. PATENT DOCUMENTS

| | | |
|---|---|---|
| 8,537,855 B2 | 9/2013 | Wieslawa |
| 8,588,089 B2 | 11/2013 | Döttling et al. |
| 8,665,835 B2 | 3/2014 | Hussein et al. |
| 8,762,511 B2 | 6/2014 | Cleary et al. |
| 8,855,625 B2 | 10/2014 | Tipton et al. |
| 8,903,893 B2 | 12/2014 | Griffith et al. |
| 9,078,144 B2 | 7/2015 | Harris et al. |
| 9,094,126 B2 | 7/2015 | Patel et al. |
| 9,113,353 B1 | 8/2015 | Cotanis et al. |
| 9,119,086 B1 | 8/2015 | Ouyang et al. |
| 9,131,404 B2 | 9/2015 | Siomina et al. |
| 9,438,393 B2 * | 9/2016 | Kobayashi ............ H04W 16/22 |
| 9,439,081 B1 * | 9/2016 | Knebl .................. H04W 16/18 |
| 2010/0311421 A1 | 12/2010 | Mach |
| 2013/0005385 A1 * | 1/2013 | Hunukumbure ...... H04W 16/22 |
| | | 455/517 |
| 2013/0189991 A1 | 7/2013 | Rose et al. |
| 2013/0331114 A1 * | 12/2013 | Gormley ............ H04W 72/082 |
| | | 455/452.1 |
| 2014/0112180 A1 | 4/2014 | Axmon et al. |
| 2014/0247750 A1 | 9/2014 | Tapia et al. |
| 2014/0256335 A1 * | 9/2014 | Kobayashi ............ H04W 16/22 |
| | | 455/450 |
| 2014/0293979 A1 | 10/2014 | Gormley et al. |
| 2014/0355481 A1 | 12/2014 | On et al. |
| 2015/0024735 A1 | 1/2015 | Ibbotson et al. |
| 2015/0071118 A1 * | 3/2015 | Sanneck ............ H04L 41/0816 |
| | | 370/255 |
| 2015/0119020 A1 | 4/2015 | Henderson et al. |
| 2015/0305045 A1 * | 10/2015 | Tapia .................. H04W 72/087 |
| | | 370/329 |
| 2016/0165462 A1 * | 6/2016 | Tan ...................... H04W 24/02 |
| | | 370/254 |
| 2016/0205697 A1 * | 7/2016 | Tan ...................... H04W 24/02 |
| | | 370/329 |

FOREIGN PATENT DOCUMENTS

| | | |
|---|---|---|
| WO | WO 2014/124671 | 8/2014 |
| WO | WO 2015/044078 | 4/2015 |
| WO | WO 2015/147735 | 10/2015 |

OTHER PUBLICATIONS

@telecoms, "Self-Organizing Network (SON) centralized versus distributed," Telecoms, telecoms.com, May 26, 2015. http://telecoms.com/opinion/self-organizing-network-son-centralized-versus-distributed/ Discloses two complementary SON models: C-SON which is a centralized SON, and D-SON which is used on vendor equipment.

Sun, Songlin, Michel Kadoch, and Tiantian Ran, "Adaptive SON and Cognitive Smart LPN for 5G Heterogeneous Networks," Mobile Networks and Applications (2015): 1-11. http://link.springer.com/article/10.1007/s11036-014-0563-2/fulltext.html Discloses a novel scheme of self-organization network by integrating cognitive radio with inter-cell interference coordination for adaptive optimization.

Østerbø, Olav, and Ole Grøndalen, "Benefits of Self-Organizing Networks (SON) for mobile operators," Journal of Computer Networks and Communications 2012 (2012). http://downloads.hindawi.com/journals/jcnc/2012/862527.pdf Discloses an evaluation of the use of SON components featuring a section (3.2) on Self-Optimization.

* cited by examiner

METHOD AND APPARATUS FOR TRANSMITTING A CONTROL SIGNAL TO A SELF ORGANIZING NETWORK CONTROLLER

The present disclosure relates to Self Organizing Networks (SON). A method and apparatus are provided that generate and transmit a control signal to a SON controller based on a desired or implemented change.

BACKGROUND

The recent proliferation of smartphone and mobile applications have induced a dramatic increase in traffic volumes on cellular networks. Cellular service providers continuously aim to maintain excellent quality of service for millions of smart connected devices.

Traditionally, network configuration management and performance optimization of a cellular network has been manual and error prone. Thus, an increase in operational expenditure is experienced. For example, a human operator would need to go through a sequence of configuration parameter settings in order to obtain an optimal service performance using available radio network resources.

SUMMARY OF THE DISCLOSURE

In one embodiment, the present disclosure describes a method and apparatus for transmitting a control signal to a self organizing network controller. For example, the method implemented via a processor receives a change, determines whether the change to at least one network element maintains an acceptable level for one or more service quality metrics based on a predicted service quality metric calculated using a modeling function, generates a control signal based on the determining, and transmits the control signal to the self organizing network controller to cause the self organizing network controller to configure the at least one network element in a communication network in accordance with the control signal.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, to address the dramatic increase in traffic volumes on cellular networks, traditional approaches are manually performed and error prone. A Self Organizing Network (SON) controller is a type of automation technology that dynamically tunes network configurations in operational environments to improve end-user service performance under continuously changing network conditions.

However, currently there is no easy way to monitor the changes implemented by a SON controller or its effects. For example, the changes to a cellular network implemented by a SON controller may not have the results that were anticipated. In other words, the service performance impact experienced by a change implemented by the SON controller is not currently quantified.

Quantifying the service performance impact by a change initiated by a SON controller involves addressing several challenges. One challenge is the dynamic nature of the networks controlled by the SON controller. The iterative, rapid configuration tuning performed by the SON controller in different aspects of the network creates a highly dynamic network environment that makes it difficult to assess the effects of configuration changes that the SON controller introduces.

Another challenge is an expected performance impact of SON. SON controllers can induce improvements in one performance metric at the cost of a minor degradation in another performance metric. Unnecessary roll-back of SON controller actions may result if one were unaware of these minor degradations as an expected behavior of a SON controller change.

A last challenge is unpredictable external network events. Equipment failures, network congestion or changes in radio channel quality are unpredictable and can impact service performance. Embodiments of the present disclosure provide a function that accounts for these challenges and can be used to quickly analyze and/or predict performance impact of a SON controller change and cause a control signal to be sent to the SON controller to either implement the change or roll back the change.

Figure 1:
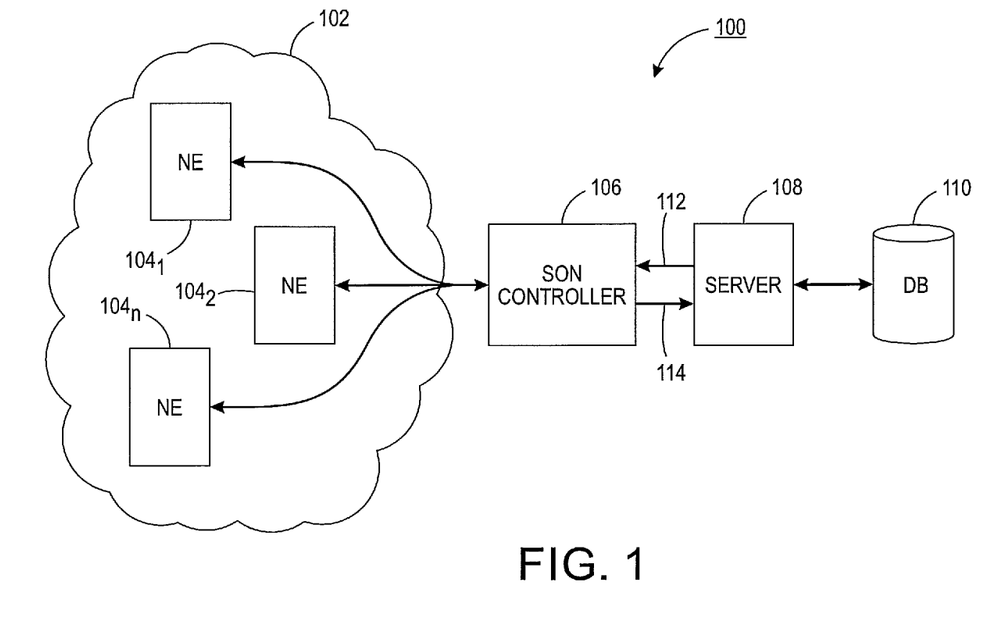
FIG. 1 illustrates an example network related to the present disclosure.

FIG. 1 illustrates an example network 100 related to the present disclosure. In one example, the network 100 may be a long term evolution (LTE) network, a universal mobile telecommunications system (UTMS) cellular network, and the like. A SON controller 106 may use LTE and UTMS metrics to automatically configure and dynamically optimize the network 100 without human intervention. The SON controller 106 may automatically react to dynamic network and traffic conditions such as suboptimal performance, congestion and equipment failure.

In one example, the configuration changes may be executed by the SON controller 106. For example, one or more network elements (NE) $104_1$ to $104_n$ (herein referred to individually as NE 104 or collectively as NEs 104) may be controlled within a region 102 within the network 100 that is controlled by the SON controller 106. It should be noted that the network 100 may include a plurality of different regions 102 with different SON controllers 106 that control each respective region 102.

In one embodiment, the NEs 104 may be any type of network element within a communication network. For example, the NEs 104 may be a cell tower, a radio tower, a base station, a gateway, a router, a switch, a core network element, an application server, and the like.

In one example, the SON controller 106 may make a change to one or more NEs 104. For example, the SON controller 106 may change a tilt angle of a radio tower antenna to improve coverage, may reconfigure a software protocol or parameter on the base station or the gateway to improve throughput or routing, and the like.

As noted above, a change in one or more of the NEs 104 executed by the SON controller 106 can improve performance of one service metric of the network 100 with a slight degradation in another service metric of the network 100. However, sometimes the degradation in the other service metric of the network 100 may be unacceptable.

Currently, there is no monitoring of the SON controller 106 to ensure that the changes implemented by the SON controller 106 is acceptable or does not inadvertently lead to undesirable results. In one embodiment, a server 108 may be in communication with the SON controller 106. It should be noted that although FIG. 1 illustrates the SON controller 106 and the server 108 as separate devices, the SON controller 106 and the server 108 may be part of the same device in one example.

The server 108 may be configured to analyze desired changes to be implemented by the SON controller 106 (e.g., a what-if analysis) and implemented changes already executed by the SON controller 106 to determine whether or not the change to one or more NEs 104 is acceptable. For example, the server 108 may generate and send control signals to the SON controller 106 over a communication path 112 and receive indications of an implemented change or a desired change via a communication path 114.

In one embodiment, the server 108 may generate a control signal that is transmitted to the SON controller 106. The control signal may cause the SON controller 106 to implement a desired change, inform the SON controller 106 to take no action on a desired change, roll back an implemented change, or confirm that an implemented change is acceptable.

In one example, the server 108 may also be in communication with a database (DB) 110. The DB 110 may store information needed by the server 108 to perform the analysis (e.g., performance metrics), the results calculated by the server 108, and the like. Although only a single server 108 and a single DB 110 are illustrated in FIG. 1, it should be noted that any number of servers 108 and DBs 110 may be deployed in the network 100.

In one embodiment, the server 108 may be configured to execute a model training phase to fit historical data to a model function that may provide an expected result given a variable. The model training phase may be an initial or pre-processing function. The model function may then be used by the server 108 to determine whether to implement the desired change or roll back an implemented change.

In one embodiment, the model function may be represented by Equation 1 below:

$$y_j = \Sigma_{i=1}^{k} c_i B_i(x), \quad\quad\quad \text{Equation (1):}$$

where i is an integer from 1 to k, $c_i$ is the model coefficients, x is a traffic load, mobility and radio environment (LMR) variable, $B_i$ is a basis function of x and y is the calculated service quality metric (SQM). In one example, the basis function $B_i$ may take various different forms such as a constant term, a hinge function, which consists of breakpoints and has the form max(0, x−breakpoint) or max(0, breakpoint−x), or an interaction term between two or more variables that use additive modeling (e.g., no interaction terms).

In one embodiment, the model coefficients $c_i$ and the basis function $B_i$ may be calculated from a scatter plot of data points of an LMR variable to an SQM. For example, the scatter plot may include a plot of traffic volume (e.g., the LMR variable) vs downlink throughput (e.g., the SQM). A piece-wise linear regression model may be applied to the scatter plot to capture the dependency of the historical LMR variables and SQMs. In other words, the SQMs may be dependent on LMR variables. The dependency represented by Equation 1 may define how the SQMs are affected by changes in the LMR variables.

The dependency between the SQMs and the LMR variables may be represented by Equation 1 such that the basis function $B_i$ and the coefficients $c_i$ are selected to minimize the error between the equation 1 and the scatter plot. In one embodiment, the values of the basis function $B_i$ and the coefficients $c_i$ may be different for each scatter plot of historical data of an LMR variable to a SQM.

In one embodiment, the SQMs may include an accessibility metric, a retainability metric and a downlink throughput metric. It should be noted that the example SQMs listed are not exhaustive and may include other examples not described herein. The accessibility metric may be defined as a probability of successful call establishments. The retainability metric may be defined as a probability of successful connection terminations. The downlink throughput metric may be defined as a total number of bytes received per second.

In one embodiment, the LMR variables may include traffic parameters, handover parameters and radio channel condition parameters. It should be noted that the example SQMs listed are not exhaustive and may include other examples not described herein.

In one embodiment, the traffic parameters may include a successful radio resource control (RRC) connection, a down link (DL) packet data convergence protocol (PDCP) volume, an uplink (UL) PDCP volume, a DL physical resource block (PRB) utilization and an UL PRB utilization. The successful RRC connection variable may be defined as whether a user is successfully allocated some radio resources to send or receive data. The DL PDCP volume variable may be defined as a traffic volume in the DL direction. The UL PDCP volume variable may be defined as a traffic volume in the UL direction. The DL PRB utilization variable may be defined as the total number of physical resource blocks utilized in the DL direction. The UL PRB utilization variable may be defined as the total number of physical resource blocks utilized in the UL direction.

In one embodiment, the handover parameters may include an inter radio access technology (IRAT) redirect, intra frequency handover attempts, and inter frequency handover attempts. The IRAT redirect variable may be defined as a number of successful redirection attempts from LTE to UMTS. The intra frequency handover attempts variable may be defined as a total number of handover attempts within the same carrier frequency. The inter frequency handover attempts may be defined as the number of handover attempts between carrier frequencies.

In one embodiment, the radio channel conditions parameters may include a relative signal strength indicator (RSSI), a block error rate (BLER) and a channel quality indicator (CQI). The RSSI variable may be defined as a total signal strength received at an eNodeB. The BLER variable may be defined as a total percentage of user data blocks received in error at the cell tower. The BLER variable may capture bad coverage. The CQI variable may be defined as a quality of a channel as reported by the user equipment. The CQI variable may capture DL interference.

Figure 2:
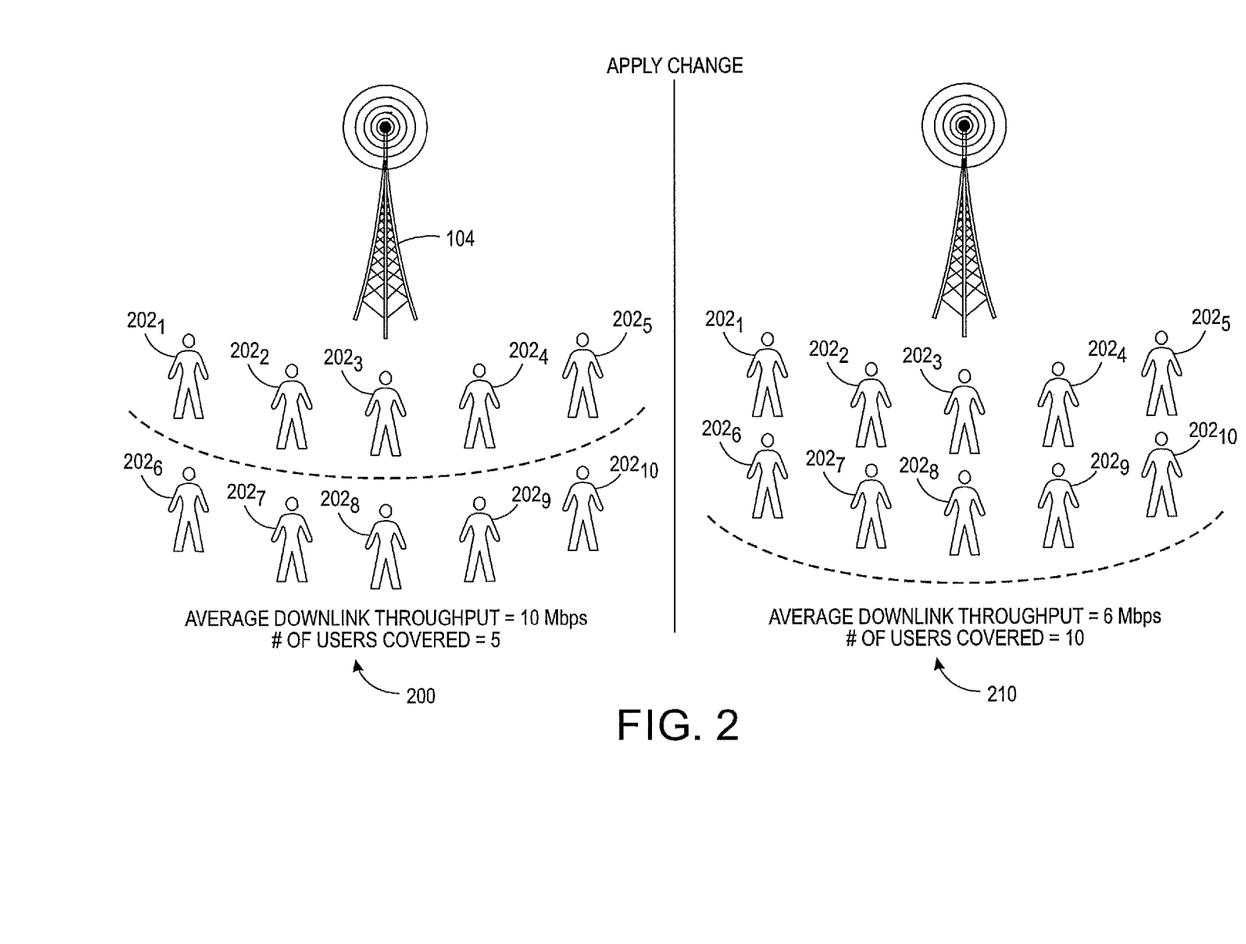
FIG. 2 illustrates an example change to a network element.

FIG. 2 illustrates one example of how the modeling can be applied by the server 108 to generate a control signal to the SON controller 106 to execute a configuration change. FIG. 2 illustrates an NE 104 that is a cell tower. The cell tower may currently provide coverage for five users $202_1$-$202_5$ at an average DL throughput of 10 megabytes per second (Mbps). However, five users $202_6$-$202_{10}$ do not have coverage with the current configuration of the NE 104.

In one embodiment, the SON controller 106 may automatically implement a change to re-configure the tilt angle of the NE 104. The implemented change may now allow all ten users $202_1$-$202_{10}$ to be covered, but at a cost of a lower DL throughput metric of 6 Mbps.

In one embodiment, the acceptable level for each SQM may be determined based on the model function applied to each SQM. For example, the model function may indicate that the DL throughput SQM should be approximately 7.5 Mbps when the total traffic for DL PDCP is increased as coverage is increased from 5 users to 10. As a result, the server 108 may determine that the implemented change has fallen below the acceptable level as indicated by Equation 1 for an increase of 5 users to 10 users. If the implemented change is unacceptable, the server 108 may generate a control signal to cause the SON controller 106 to roll back (e.g., configure the NE 104 back to the tilt angle before the tilt angle was changed) the implemented change.

In another example, the change may be a desired change. For example, a "what-if" analysis may be performed by the server 108 to determine what would happen if the tilt angle of the NE 104 was changed to increase coverage from five users to ten users. The modeling function may be applied to the DL PDCP volume variable to calculate the DL throughput metric when the volume associated with five users is increased to volume associated with ten users. The server 108 may determine that the DL throughput would be decreased from 10 Mbps to 7.5 Mbps, which may be an acceptable level to a service provider of the network 100. As a result, the server 108 may generate a control signal to cause the SON controller 106 to implement the desired change and change the tilt angle of the NE 104.

In one embodiment, the server 108 may receive data from the network 100 that the average DL throughput has actually been reduced to 6 Mbps as indicated in FIG. 2. As a result, the server 108 may determine there is another error in the network 100 as the observed DL throughput does not match the expected DL throughput based on the modeling function. As a result, the server 108 may generate a control signal and transmit the control signal to the SON controller 106 to cause the SON controller 106 to roll back the change.

As such, the present disclosure provides at least one advancement in the technical field of SON controllers. This advancement improves the performance of networks controlled by a SON controller and ensures that changes implemented by the SON controllers operate as intended.

Figure 3:
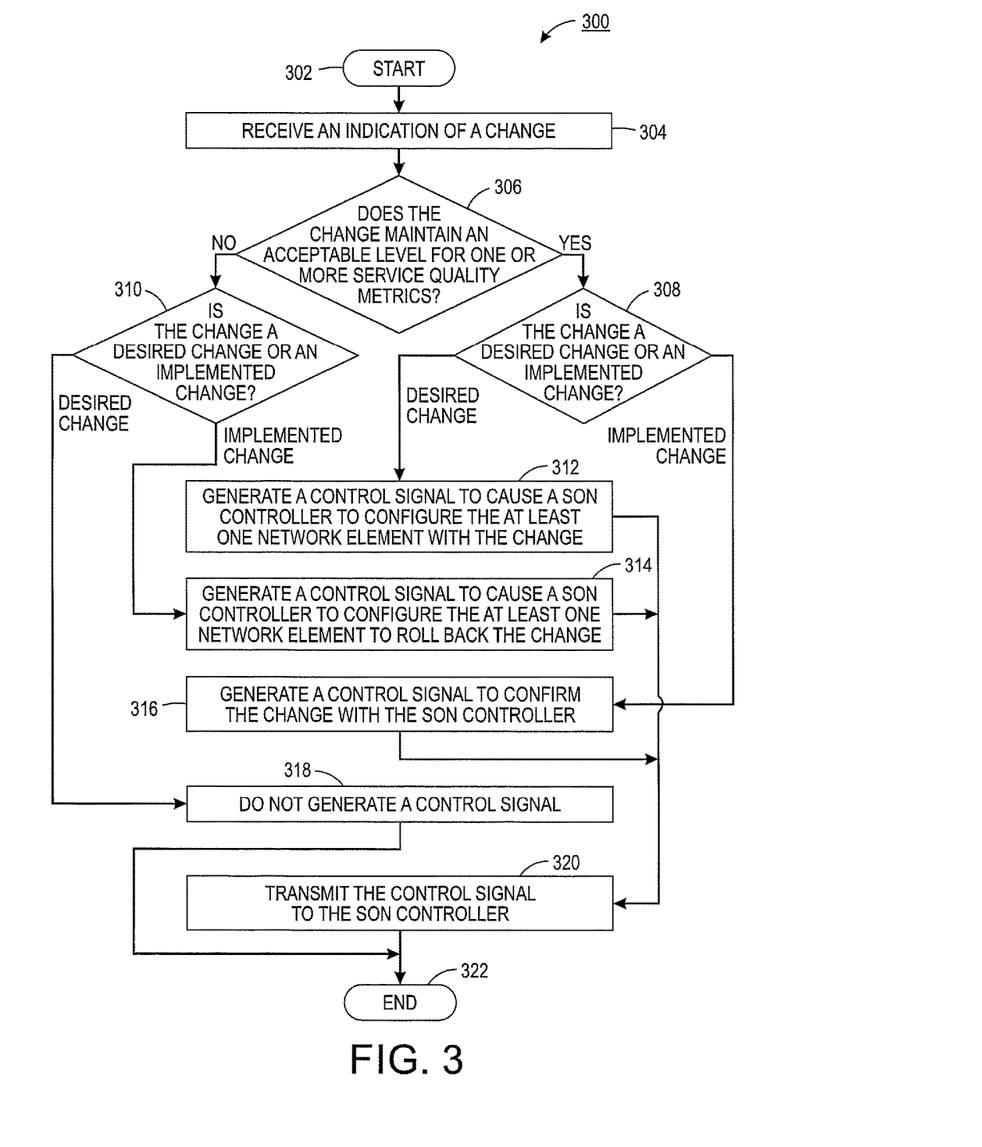
FIG. 3 illustrates a flowchart of an example method of the present disclosure for transmitting a control signal to a self organizing network controller.

FIG. 3 illustrates a flowchart of an example method 300 of the present disclosure for transmitting a control signal to a SON controller. In one embodiment, the method 300 may be implemented by the server 108 dedicated for performing the functions described herein or the computer or processor as described in FIG. 5.

At step 302, the method 300 begins. At step 304, the method 300 receives a change. The change may be a desired change to one or more network elements within the network or an already implemented change to one or more network elements within the network. The change may be a mechanical change (e.g., changing an angle of an antenna, a direction of a radio, and the like) or a software change (e.g., changing a routing table, changing a firmware version, and the like).

At step 306, the method 300 determines whether the change maintains an acceptable level for one or more service quality metrics. For example, a model function may be used for how a change in a LMR variable will affect an SQM. In one example, the acceptable level may be based on the predicted SQM given a change to the LMR using the modeling function (e.g., Equation 1 described above). In another embodiment, the acceptable level may be a predetermined value or level of the SQM selected by a service provider of the SON.

In one embodiment, the determining may be based on calculating a predicted service quality metric for each one of the SQMs. For a "what if" change, the determining may be based on the predicted SQM for each SQM maintaining a respective acceptable level based on the change. For an implemented change, the determining may be based on the predicted SQM and an observed SQM for each SQM maintaining a respective acceptable level based on the change.

In one embodiment, the method 300 may also determine whether the level of the one or more service quality metrics is acceptable for a particular quality of service (QoS) level. For example, degradation in accessibility for best effort QoS may be sacrificed for improvement in accessibility of voice QoS.

If the answer to step 306 is yes, the method 300 may proceed to step 308. At step 308, the method 300 determines whether the change is a desired change or an implemented change. If the change is an implemented change, the method 300 may proceed to step 316.

At step 316, the method 300 generates a control signal to confirm the change with the SON controller. In other words, the SON performed an automatic change to the SON controller and the change resulted in an SQM that was in-line with the prediction of the model function. As a result, the change may be maintained. The method 300 may then proceed to step 320.

Referring back to step 308, if the change is a desired change, then the method 300 may proceed to step 312. At step 312, the method 300 generates a control signal to cause a SON controller to configure the at least one network element with the change. In other words, the model function may predict that the SQM will be above an acceptable level when the desired change is implemented. The method 300 may then proceed to step 320.

Referring back to step 306, if the answer to step 306 is no, the method 300 may proceed to step 310. At step 310, the method 300 determines whether the change is a desired change or an implemented change. If the change is an implemented change, the method 300 may proceed to step 314.

At step 314, the method 300 may generate a control signal to cause a SON controller to configure the at least one network element to roll back the change. In other words, the SON controller may have made a change to the at least one network element automatically. However, the change may have resulted in an unexpected result in the SQM or caused the SQM to fall below the acceptable level. As a result, the control signal may be generated that would cause the SON controller to configure the at least one network element back to how the at least one network element was configured before the change was implemented. The method 300 may then proceed to step 320.

Referring back to step 310, if the change is a desired change, the method 300 may proceed to step 318. At step 318, the method does not generate a control signal. In other words, the desired change would not result in an acceptable level of SQM. Thus, the desired change may not be implemented and no control signal would be generated for the SON controller. The method 300 may then proceed to step 322.

At step 320, the method 300 may transmit the control signal to the SON controller. The SON controller may then act in accordance with control signal. At step 322, the method 300 ends.

In addition, although not specifically specified, one or more steps, functions or operations of method 300 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 3 that recite a determining operation or involve a decision do not necessarily require that both branches of the determining operation be practiced. In other words, one of the branches of the determining operation can be deemed as an optional step. Moreover, steps, blocks, functions or operations of the above described method 300 can be combined, separated, and/or performed in a different order from that described above, without departing from the example embodiments of the present disclosure.

Figure 4:
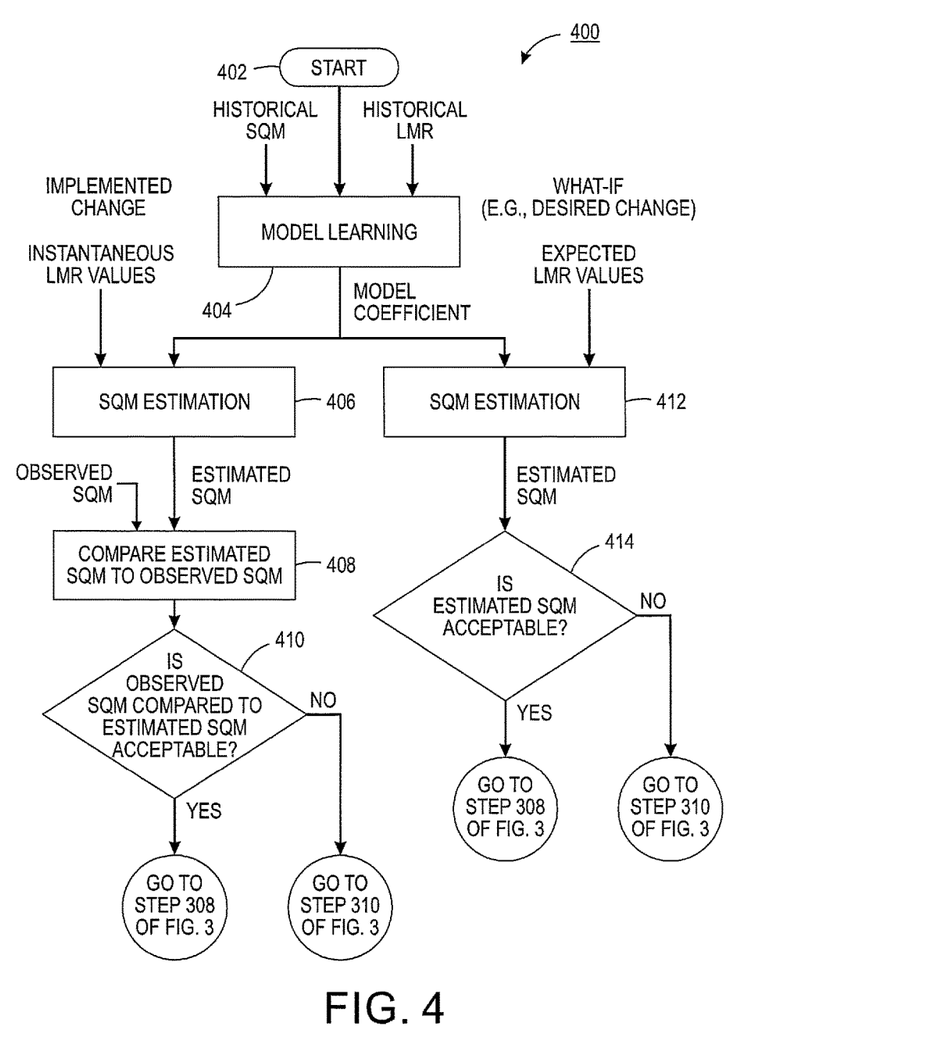
FIG. 4 illustrates a flowchart of an example method of determining whether a change is acceptable.

FIG. 4 illustrates a flowchart of an example method 400 of the present disclosure for determining whether a change is acceptable. In one embodiment, the method 400 may be a more detailed explanation of how the decision box 306 in FIG. 3 operates. In one embodiment, the method 400 may be implemented by the server 108 dedicated for performing the functions described herein or the computer or processor as described in FIG. 5.

At step 402, the method 400 begins. At step 404, the method 400 may perform model learning. As described above, the model learning may be a pre-processing step, e.g., implemented off-line. The model learning may receive the historical SQMs and the historical LMR variables as described above with respect to Equation 1 to calculate the model coefficient. In one embodiment, the model coefficient may then be used for both an implemented change analysis and a what-if analysis (e.g., the desired change).

Beginning with the implemented change scenario at step 406, the method 400 may perform SQM estimation using instantaneous LMR variables. In other words, the LMR variables associated with the current communication network settings or configuration parameters may be provided to perform the SQM estimation based on the model coefficient that is calculated.

At step 408, the method 400 may compare the estimated, or predicted, SQM to an observed SQM. At step 410, the method 400 may determine if the observed SQM compared to the estimated SQM is acceptable. If the answer to step 410 is yes, the method 400 may continue to step 308 of FIG. 3. If the answer to step 412 is no, the method 400 may continue to step 310 of FIG. 3.

As noted above, the model coefficient may also be provided for the what-if analysis. At step 412, the method 400 may perform SQM estimation using expected LMR values associated with the desired change. In one embodiment, the expected LMR values may be obtained based on historical data, a model, a relationship between network configurations and the LMR values, and the like.

The estimated SQM may be provided to step 414. At step 414, the method 400 may determine if the estimated SQM is acceptable. If the answer to 414 is yes, the method 400 may continue to step 308 of FIG. 3. If the answer to 414 is no, the method 400 may continue to step 310 of FIG. 3.

Figure 5:
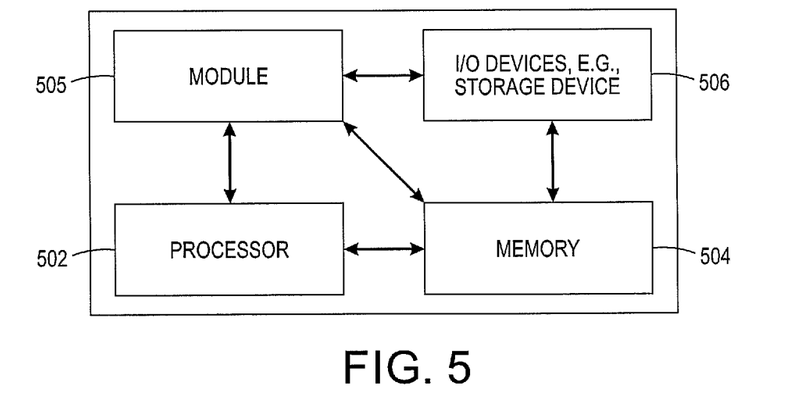
FIG. 5 depicts a high-level block diagram of a computer suitable for use in performing the functions described herein.

FIG. 5 depicts a high-level block diagram of a computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for transmitting a control signal to a SON controller, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the methods 300 and 400 as discussed above is implemented in a distributed or parallel manner for a particular illustrative example, i.e., the steps of the above methods 300 and 400, or the entire methods 300 and 400 are implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method. In one embodiment, instructions and data for the present module or process 505 for transmitting a control signal to a SON controller (e.g., a software program comprising computer-executable instructions) can be loaded into memory 504 and executed by hardware processor element 502 to implement the steps, functions or operations as discussed above in connection with the illustrative methods 300 and 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for transmitting a control signal to a SON controller (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for transmitting a control signal to a self organizing network controller, the method comprising:
receiving, via a processor, a change to at least one network element of a communication network from the self organizing network controller;
determining, via the processor, whether the change to the at least one network element maintains an acceptable level for one or more service quality metrics of the communication network based on a predicted service quality metric calculated using a modeling function, wherein the one or more service quality metrics comprise: an accessibility metric and a retainabillity metric, wherein the accessibility metric comprises a probability of successful call establishments, wherein the retainability metric comprises a probability of successful connection terminations, wherein the modeling function is based on one or more of: a traffic load variable, a mobility variable and a radio environment variable;
generating, via the processor, the control signal based on the determining, wherein the control signal indicates to the self organizing network controller: to implement the change, to roll back the change when the change has already been implemented, or that the change when already implemented is acceptable; and
transmitting, via the processor, the control signal to the self organizing network controller to cause the self organizing network controller to configure the at least one network element in the communication network in accordance with the control signal.

2. The method of claim 1, wherein the change comprises a desired change.

3. The method of claim 2, wherein the desired change is determined to maintain an acceptable level for the one or more service quality metrics and the control signal causes the self-organizing network controller to configure the at least one network element in the communication network with the change.

4. The method of claim 1, wherein the change comprises an implemented change.

5. The method of claim 4, wherein the implemented change is determined to fail to maintain an acceptable level for the one or more service quality metrics and the control signal causes the self-organizing network controller to configure the at least one network element in the communication network to roll back the implemented change.

6. The method of claim 1, wherein the one or more service quality metrics further comprise a downlink throughput metric.

7. The method of claim 1, wherein the determining comprises:
calculating, via the processor, the predicted service quality metric for each one of the one or more service quality metrics, wherein the determining is based on at least one of: the predicted service quality metric or an observed service quality metric for the each one of the one or more service quality metrics maintaining a respective acceptable level based on the change to the at least one network element.

8. A non-transitory computer-readable storage device storing a plurality of instructions which, when executed by a processor, cause the processor to perform operations for transmitting a control signal to a self organizing network controller, the operations comprising:
receiving a change to at least one network element of a communication network from the self organizing network controller;
determining whether the change to the at least one network element maintains an acceptable level for one or more service quality metrics of the communication network based on a predicted service quality metric calculated using a modeling function, wherein the one or more service quality metrics comprises: an accessibility metric and a retainabillity metric, wherein the accessibility metric comprises a probability of successful call establishments, wherein the retainability metric comprises a probability of successful connection terminations, wherein the modeling function is based on one or more of: a traffic load variable, a mobility variable and a radio environment variable;
generating the control signal based on the determining, wherein the control signal indicates to the self organizing network controller: to implement the change, to roll back the change when the change has already been implemented, or that the change when already implemented is acceptable; and
transmitting the control signal to the self organizing network controller to cause the self organizing network controller to configure the at least one network element in the communication network in accordance with the control signal.

9. The non-transitory computer-readable storage device of claim 8, wherein the change comprises a desired change.

10. The non-transitory computer-readable storage device of claim 9, wherein the desired change is determined to maintain an acceptable level for the one or more service quality metrics and the control signal causes the self-organizing network controller to configure the at least one network element in the communication network with the change.

11. The non-transitory computer-readable storage device of claim 8, wherein the change comprises an implemented change.

12. The non-transitory computer-readable storage device of claim 11, wherein the implemented change is determined to fail to maintain an acceptable level for the one or more service quality metrics and the control signal causes the self-organizing network controller to configure the at least one network element in the communication network to roll back the implemented change.

13. The non-transitory computer-readable storage device of claim 8, wherein the one or more service quality metrics further comprise a downlink throughput metric.

14. The non-transitory computer-readable storage device of claim 8, wherein the determining comprises:
calculating the predicted service quality metric for each one of the one or more service quality metrics, wherein the determining is based on at least one of: the predicted service quality metric or an observed service quality metric for the each one of the one or more service quality metrics maintaining a respective acceptable level based on the change to the at least one network element.

15. An apparatus for transmitting a control signal to a self organizing network controller, the apparatus comprising:
   a processor; and
   a computer-readable storage device storing a plurality of instructions which, when executed by the processor, cause the processor to perform operations, the operations comprising:
      receiving a change to at least one network element of a communication network from the self organizing network controller;
      determining whether the change to the at least one network element maintains an acceptable level for one or more service quality metrics of the communication network based on a predicted service quality metric calculated using a modeling function, wherein the one or more service quality metrics comprise: an accessibility metric and a retainabillity metric, wherein the accessibility metric comprises a probability of successful call establishments, wherein the retainability metric comprises a probability of successful connection terminations, wherein the modeling function is based on one or more of: a traffic load variable, a mobility variable and a radio environment variable;
      generating the control signal based on the determining, wherein the control signal indicates to the self organizing network controller: to implement the change, to roll back the change when the change has already been implemented, or that the change when already implemented is acceptable; and
      transmitting the control signal to the self organizing network controller to cause the self organizing network controller to configure the at least one network element in the communication network in accordance with the control signal.

16. The apparatus of claim 15, wherein the change comprises a desired change, wherein the desired change is determined to maintain an acceptable level for the one or more service quality metrics and the control signal causes the self-organizing network controller to configure the at least one network element in the communication network with the change.

17. The apparatus of claim 15, wherein the change comprises an implemented change, wherein the implemented change is determined to fail to maintain an acceptable level for the one or more service quality metrics and the control signal causes the self-organizing network controller to configure the at least one network element in the communication network to roll back the implemented change.

18. The apparatus of claim apparatus 15, wherein the determining comprises:
   calculating the predicted service quality metric for each one of the one or more service quality metrics, wherein the determining is based on the predicted service quality metric for the each one of the one or more service quality metrics maintaining a respective acceptable level based on the change to the at least one network element.

* * * * *